United States Patent Office 3,114,733
Patented Dec. 17, 1963

3,114,733
PROCESS FOR THE PRODUCTION OF
EUPOLYOXYMETHYLENES
Heinrich Hopff and Hermann Metzler, Zurich, Switzerland, assignors to Deutsche Gold- und Silber-Scheideanstalt vormals Roessler, Frankfurt, Germany
No Drawing. Filed June 13, 1960, Ser. No. 35,414
Claims priority, application Germany June 12, 1959
11 Claims. (Cl. 260—67)

The present invention relates to a novel process for the production of eupolyoxymethylenes.

The object of the present invention is to provide novel polymerization catalysts for the polymerization of eupolyoxymethylenes. The utilization of these catalysts, furthermore, results in the production of polyoxymethylenes which have high molecular weights and which exhibit good thermoplastic characteristics.

Eupolyoxymethylenes can be produced by several different processes. Among these processes, for example, there is the technique of polymerizing monomeric formaldehyde in an inert liquid medium in the absence of water and in the presence of dispersing agents and polymerization catalysts, such as, aliphatic or aromatic amines. Such processes are disclosed in U.S. 2,768,994 and "High Molecular Organic Compounds" (Die hochmolekularen organischen Verbindungen), H. Staudinger and W. Kern, 1932, pages 280–287. Trialkylarsines, trialkylstibines and trialkylphosphines have also been used as catalysts in these polymerization techniques. Furthermore it is also known to the art that formaldehydes can be polymerized at lower temperatures in solvents in the presence of sulfuric acid or boron trichloride. The polymerization can also be conducted so that a small portion of the total quantity of formaldehyde to be polymerized is first polymerized before the remaining major portion is polymerized and this smaller quantity of polymer is then separated from the as yet unpolymerized major portion of the monomer together with any impurities that may be present.

It has also been proposed, in order to obtain eupolyoxymethylenes with improved resistance to heat, to polymerize the monomeric formaldehyde in the presence of a sulfur compound which contains the structural element

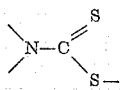

Sulfur compounds of this type include, for example, thiouram disulfide, tetramethyl thiouram disulfide, 2-mercaptobenzothiazole and the like. This disclosure is made in U.S. application S.N. 815,280, filed May 25, 1959.

It is also known that eupolyoxymethylenes can be produced from formaldehyde in the presence of compounds having the general formula R$n$M, in which M is a metal such as copper or aluminum and R is a thiohydrocarbon radical.

It has also been proposed, as disclosed in U.S. application S.N. 690, filed January 6, 1960, now Patent Number 3,020,264, to produce eupolyoxymethylenes from monomeric formaldehyde by conducting the polymerization in the presence of sulphur suspended or dissolved in dry benzine and/or decalin and by using monomeric formaldehyde that has freed of moisture as much as possible. In this procedure the cross-sectional particle size of the suspended sulfur is preferably smaller than 200$\mu$. According to this proposed process the sulfur to be used can be ventilated pure sulfur or fine particled plastic sulfur or a monoclinic or a macromolecular sulfur which is insoluble in rubber.

Another proposal, as disclosed in United States application 22,088, filed March 24, 1960, states that eupolyoxymethylenes can also be produced easily and in good yields by the polymerization of water free formaldehyde or lower molecular weight polymers of formaldehyde in the presence of an inert organic diluent such as petroleum ether or a higher boiling hydrocarbon fraction if desired and a catalyst, if at least one halogenated methane is used as the catalyst. Such halogenated methanes, for example, are carbon tetrachloride, chloroform, methylene chloride, bromoform and the like.

It has now been found according to the present invention, that eupolyoxymethylenes can also be produced by the polymerization of formaldehyde or lower molecular weight polymers of formaldehyde, such as trioxane, in the presence of an inert organic diluent if desired and a catalyst if at least one free halogen is used as the catalyst.

Of particular utility as catalysts, within the scope of the present invention, are chlorine, bromine and iodine. These catalysts are used in small quantities, generally, in the range of 0.01 to 10% based on the weight of material to be polymerized.

It is advantageous to conduct the polymerization process of the present invention at temperatures of 50 to 170° C. and preferably at 70 to 75° C. and if necessary under increased pressures. It is also often advantageous to conduct the polymerization in the presence of an inert organic diluent such as petroleum ether or higher boiling hydrocarbons.

The process of this invention can be conducted in such a way, for example, that the lower molecular weight starting material, trioxane for example, is mixed with small amounts of the halogen catalyst, in the presence of an organic diluent if desired, and the system is then heated at a higher temperature within the range of 50–170° C. until the termination of the polymerization reaction. In a particular case the use of increased pressure of the order of 1–20 atmospheres may be necessary. However, it is also possible, to set up a polymerization system by introducing the formaldehyde or other starting material, in gaseous form, into the organic diluent which contains the halogen catalyst dispersed therein.

The eupolyoxymethylenes thus produced can be freed from lower molecular weight components of the system, which may be still present after the termination of the polymerization reaction, by washing the former with a solvent such as methanol. The lower molecular weight polymers, in turn, can be extracted from the methanol wash solution with a dilute solution of sodium hydroxide.

The softening point of the eupolyoxymethylenes produced by this novel process lies between 170 and 185° C. They have a molecular weight of about 20,000 to 35,000 depending on reaction conditions. The yields run from approximately 95% to 100%.

The eupolyoxymethylenes produced according to this invention can be readily worked up into formed bodies in the customary thermoplastic processes, such as, for example, extrusion molding, pressing, and the like, or they can be used to coat objects. When desirable, it is also possible to conduct the process of this invention in the presence of other known materials for improving the workability of the eupolyoxymethylenes and/or their stability and/or mechanical properties of the shaped bodies produced therefrom. Among such materials are plasticizers, such as the glycols, particularly propylene glycol and stabilizers, that is, compounds which react with hydroxyl groups, such as carboxylic acid anhydrides, for example, acetic acid anhydride, propionic acid anhydride and the like, and ketenes. In addition urea, hydrazine and the like can also be used as stabilizers.

It is possible to obtain formed bodies which are ductile and elastic from the novel eupolyoxymethylenes produced by this invention. Furthermore when these formed bodies are heated to 180° C. for an hour only a trivial amount of depolymerization takes place.

It is also advantageous to use other catalysts which are known to be formaldehyde polymerization catalysts, together with the halogen catalysts of the present invention. Such other formaldehyde polymerization catalysts include, in particular, metal carbonyls such as iron penta carbonyl, cobalt carbonyl, molybdenum carbonyl and the like.

It is also advantageous in this regard to use highly dispersed, particularly active filling materials, for example, carbon black and preferably alkaline carbon black or oxides of metals or metalloids such as aluminum oxide, titanium oxide, zirconium oxide or silicon dioxide which were obtained by decomposing volatilized compounds of these materials at high temperature in an oxidizing or hydrolyzing medium.

The following examples are illustrative of the present invention but are not intended as a limitation thereon.

*Example 1*

50 parts of 98% trioxane were heated with 0.5 part of chlorine gas in an autoclave on a water bath at 70° C. for 24 hours. After the unreacted trioxanes were removed by washing with methanol there remained 45 parts of a polymer having a melting point of 180° C. and a molecular weight of about 25,000.

*Example 2*

50 parts of 98% trioxane were heated at 70° C. in an autoclave for 12 hours with 1 part of iodine. 47 parts of eupolyoxymethylenes were recovered after the polymerization mixture was washed with methanol. The polymer had a softening point of 180° C. and a molecular weight of about 20,000.

*Example 3*

100 parts of technical grade trioxane were heated at 70° C. for 24 hours with 200 parts of petroleum ether which contained 0.5 part of bromine. After the solvent was distilled off there remained behind a white mass of eupolyoxymethylenes which had a softening point of 170°–175° C. and a molecular weight of about 21,000.

*Example 4*

10 parts of paraformaldehyde were heated at 100° C. in an ampoule for 6 hours with 0.1 part of iodine. The reaction mass was washed with methanol and dried. 9 parts of polyoxymethylene were obtained, having a softening point of approximately 181–187° C.

*Example 5*

10 parts of 98% trioxane, 10 parts of acetone and 0.1 part of iodine were closed in an ampoule and stored at room temperature for 6 hours. After the solvent was distilled off there remained behind a white mass of eupolyoxymethylenes which was washed with methanol to give, after drying, 3 parts of the polymerizate. This eupolyoxymethylenes had a softening point of 170–174° C.

Following the route described in this example there can be used as a diluent methylethyl ketone, acetophenone, acetaldehyde or benzaldehyde.

Other diluents which are suitable for the process of the invention are methylisopropyl ketone or ethylethyl ketone. Other catalysts which can be used for the polymerization of formaldehyde compounds in the process of the invention are compounds of free halogens between each other, such as ICl, $ICl_3$, IBr for example. The term "free halogens" comprises therefore free elemental halogens as $Cl_2$, $Br_2$, $I_2$ and also compounds of these halogens as shown above.

The polyoxymethylenes obtained in this process are partially or complete soluble in carbonyl compounds, e.g. aldehydes and ketones, such as acetone, acetophenone, benzaldehyde, diethyl ketone, methylisopropyl ketone and on the other hand in dimethylsulfoxide or dimethylformamide.

We claim:

1. In a process for the production of eupolyoxymethylenes, the step of polymerizing in the absence of water a formaldehyde compound selected from the group consisting of monomeric formaldehyde and lower molecular weight polymers of formaldehyde in contact with 0.01 to 10% by weight based on the formaldehyde compound of at least one free halogen selected from the group consisting of chlorine, bromine and iodine as the polymerization catalyst.

2. A process as in claim 1 in which said polymerization is conducted in an inert organic diluent.

3. A process as in claim 1 in which said polymerization is conducted at a temperature of 50 to 170° C.

4. A process as in claim 3 in which said temperature is 70 to 75° C.

5. A process as in claim 3 in which said polymerization is conducted under increased pressure.

6. A process as in claim 2 in which said inert organic diluent is petroleum ether.

7. A process as in claim 1 in which said formaldehyde compound is trioxane.

8. A process as in claim 1 in which said halogen is chlorine.

9. A process as in claim 1 in which said halogen is bromine.

10. A process as in claim 1 in which said halogen is iodine.

11. A process as in claim 1 in which said formaldehyde compound is paraformaldehye.

References Cited in the file of this patent

UNITED STATES PATENTS 2,734,889     Starr  ---------------- Feb. 14, 1956

OTHER REFERENCES

Walker, J. F.: Formaldehyde, 2nd edition, pages 197–198 (1953).

Walker, J. F.: Formaldehyde, 2nd edition, chapter 7 (1953).